UNITED STATES PATENT OFFICE.

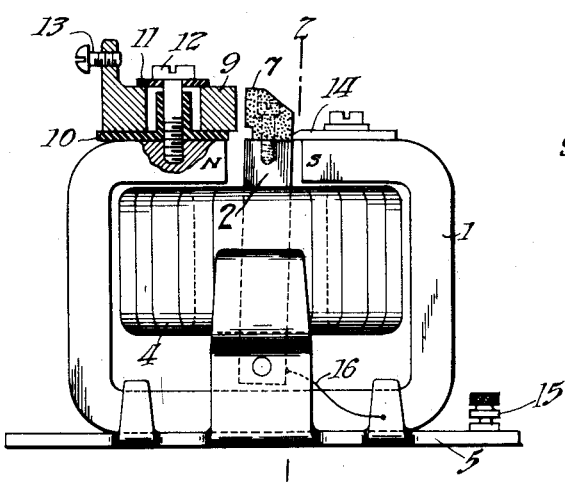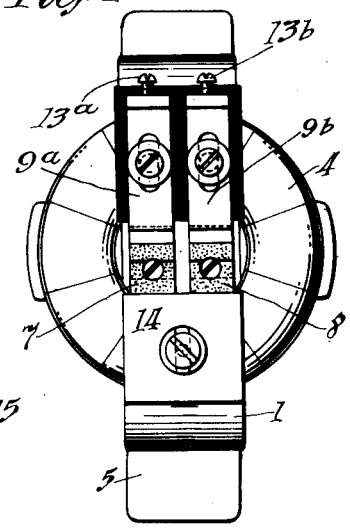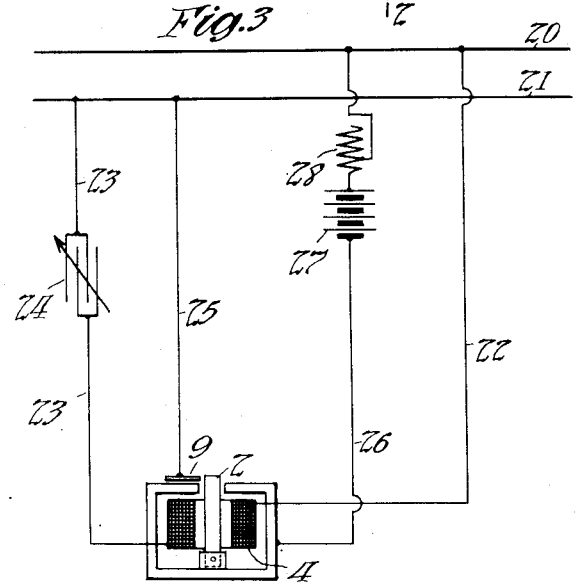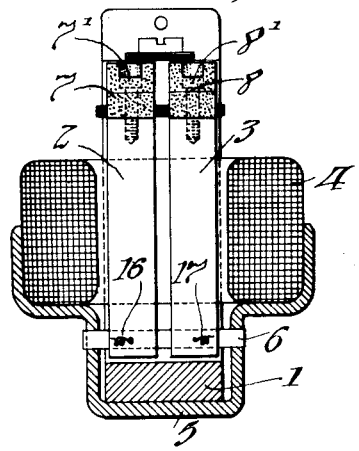

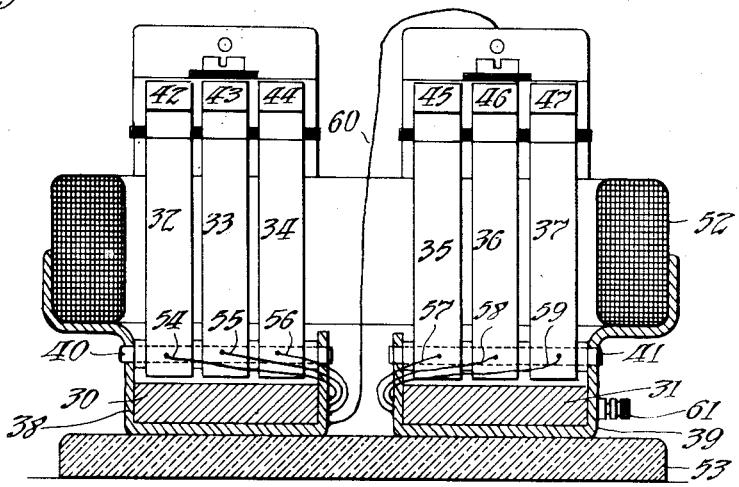
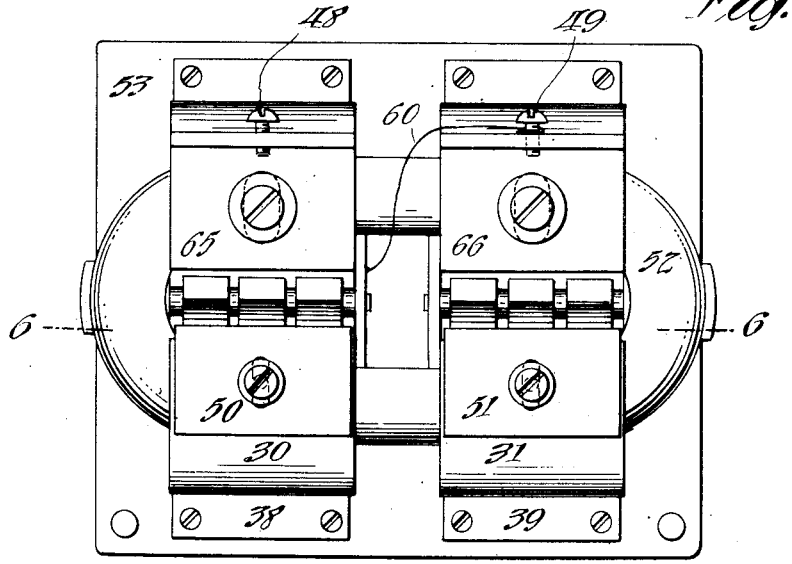

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

ALTERNATING-CURRENT RECTIFIER.

1,221,981.      Specification of Letters Patent.      Patented Apr. 10, 1917.

Application filed December 30, 1911. Serial No. 668,611.

*To all whom it may concern:*

Be it known that I, THOMAS A. EDISON, a citizen of the United States, and a resident of Llewellyn Park, West Orange, Essex county, New Jersey, have invented certain new and useful Improvements in Alternating-Current Rectifiers, of which the following is a specification.

My invention relates to alternating current rectifiers and more particularly to that type of such rectifiers in which vibrating contacts are employed to open and close a circuit or circuits connected to a source of alternating current and to a direct current translating device or devices in such a manner as to cause the current impulses to pass into the direct current translating device or devices in one direction only.

The usefulness of rectifiers of this type as hitherto constructed has been materially limited by the small current-carrying capacity of the apparatus and by their inability to operate successfully on any but low voltage circuits, because of sparking and sticking of contacts. My invention has for its object the provision of simple, efficient and compact rectifying devices in which these and other difficulties and objections are overcome.

In one aspect, my invention consists in a rectifying unit or units, each having a plurality of armatures capable of vibration and adapted to open and close a circuit or circuits and means for causing the armatures to vibrate in synchronism with the alternating current to be rectified. Preferably, the armatures are capable of independent movement and are actuated by a single coil. In my improved rectifiers I secure the advantages of compactness, and of small inertia in the vibrating parts and consequent sensitiveness of operation in following the changes of current in the alternating current circuit. I may connect the contacts carried by the armatures in parallel, series, or series-parallel, and the armatures preferably form parts of the electrical circuits. The parallel connection affords a plurality of current conducting paths through the rectifying unit, and a large current-carrying capacity is thus secured. The series connection affords a plurality of breaks in series in a single unit, whereby sparking is reduced and the apparatus is rendered capable of rectifying currents of relatively high voltage. The series-parallel connection combines the advantages of the series and parallel connections.

In another aspect, my invention consists in the employment of contact members having relatively large contact surfaces, one or both of each pair of coöperating contact members being preferably of carbon. By the use of contacts of this character, the current carrying capacity of each rectifying unit is increased, sticking of contacts is prevented, and sparking is reduced.

My invention consists also in the details of construction and combinations of parts hereinafter described more fully and claimed.

In the drawings which accompany and form a part of this specification—

Figure 1 is a side elevation partly in section of one embodiment of my improved rectifier;

Fig. 2 is a section taken on the line 2—2 of Fig. 1;

Fig. 3 is a diagrammatic view showing a system in which my improved rectifier is adapted to be used, and in which the rectifier is connected to an alternating current circuit for supplying uni-directional current to a storage battery;

Fig. 4 is a plan view of a modified form of my improved rectifier;

Fig. 5 is a plan view of another modification of the same; and

Fig. 6 is a section taken on the line 6—6 of Fig. 5.

In the embodiment of my invention which is illustrated in Figs. 1, 2, and 3, I provide a magnet 1 which is preferably a permanent magnet having an almost completely closed magnetic circuit. In the gap between the north and south poles of the magnet 1, two or more armatures 2 and 3, of magnetic material and preferably soft iron, are located. Surrounding the armatures 2 and 3 an actuating coil 4 is provided. The magnet 1, armatures 2 and 3 and coil 4 are supported in any suitable manner as by means of a frame or base 5 of conductive material. The armatures 2 and 3 are mounted so as to be capable of vibration in the gap of the magnet 1, as for example, by being pivotally mounted upon a pivot 6 of conductive material supported in the frame 5. The armatures 2 and 3 are preferably so mounted as to be capable of independent movement. The armatures 2 and 3 are provided with suitable contacts 7 and 8 adapted to coöperate with a stationary contact 9. The contacts 7 and 8 have relatively large contact surfaces and are preferably made of carbon. The carbon contacts 7 and 8 may be mounted upon or secured to the armatures 2 and 3 in any suitable manner, as for example, by screws 7' and 8' extended through the contacts 7 and 8 and threaded into the ends of the armatures 2 and 3. The stationary contact 9 has a relatively large contact surface adapted to coöperate with the contacts 7 and 8, and is preferably made of conducting metal, such as copper or brass, but may be made of carbon. The stationary contact 9 is preferably adjustably mounted upon the magnet 1, and is insulated therefrom by insulating members 10 and 11 and adjustably secured thereto by means of a screw 12. The stationary contact 9 is provided with a screw or binding post 13 for connecting the contact in a circuit. Obviously, the stationary contact 9 may consist of a plurality of contacts suitably connected together. A stop 14 of non-magnetic material and preferably adjustably mounted upon the magnet 1 is provided to limit the backward movement of the armatures 2 and 3 and to keep them from sticking to the pole of the magnet. The stationary contact 9 and the stop 14 are preferably so adjusted that the amplitude of movement of the vibrating contacts is very small, for example, from five to ten one-thousandths of an inch. A binding post 15 is provided on the base 5. The armatures 2 and 3 are in electrical connection with the base 5 and its binding post 15 through the pivot 6 and through flexible wires 16 and 17 connecting the armatures 2 and 3 respectively to the base 5. The wires 16 and 17 are secured to the armatures 2 and 3 near their pivotal axes, so as to interfere as little as possible with their freedom of vibration.

Referring particularly to Fig. 3, alternating current mains are shown at 20 and 21. One terminal of the coil 4 is connected to one of the alternating current mains 20 by a conductor 22, and the other terminal of the coil 4 is connected to the other main 21 by the conductor 23. An adjustable condenser 24 is preferably connected in series with the coil 4 and is shown inserted in the conductor 23. The stationary contact 9 is connected to one side of the alternating current circuit 21 by means of conductor 25, and the frame of the device is connected to the other side of the alternating current circuit 20 by means of the conductor 26. In the circuit containing the contact 9, the direct current translating device or devices are connected. I have illustrated as such a device a storage battery 27 and also an adjustable rheostat 28 inserted in the connection 26.

The mode of operation of my improved rectifying device is as follows:—Reversals of current occur in the coil 4 and an alternating flux is set up in the armatures 2 and 3, thereby making the upper ends of the armatures alternately north and south poles. Furthermore, when the upper ends of the armatures are of north polarity, the south pole of the permanent magnet is strengthened and the north pole weakened, and when the upper ends of the armatures are of south polarity, the north pole of the permanent magnet is strengthened and the south pole weakened. As a result, the armatures are vibrated in synchronism with the alternating current flowing through the coil 4. When the contacts 7 and 8 are in contact with the contact 9 a circuit is established from the alternating current main 21 through the conductor 25 and contact 9, where the circuit divides, one branch of it extending through the contact 7, armature 2, to the frame 5 and binding post 15, and the other branch extending through the contact 8, armature 3 and the frame 5 to binding post 15, then from the binding post 15 to the conductor 26, storage battery or other direct current translating device 27, rheostat 28, to the other side of the alternating current circuit 20. This condition of affairs continues during one half wave of the alternating current. During the succeeding half wave, the circuit is broken at the contacts 7, 8 and 9. In this manner, uni-directional current is supplied to the storage battery or other direct current translating device 27. The adjustable condenser 24 in series with the coil 4 is employed to advance the phase of the current in the coil in order to compensate for the inertia of the armatures and to cause the circuit to be broken at the proper times to avoid sparking.

By the provision of a plurality of comparatively light armatures, capable of independent vibration, I am enabled to secure great sensitiveness of operation, and the armatures in their movements follow closely the variations of current in the line and the coil 4. By connecting the contacts and armatures in parallel, I am enabled to secure a large current-carrying capacity in the apparatus.

Instead of connecting the contacts in parallel, I may connect them in series as is illustrated in Fig. 4, or in series-parallel as is illustrated in Figs. 5 and 6.

The modification illustrated in Fig. 4 differs from that shown in Figs. 1 and 2 in having two stationary contacts $9^a$ and $9^b$ instead of the single contact 9 shown in Figs. 1 and 2. The two contacts $9^a$ and $9^b$ are insulated from each other and from the magnet 1. The contacts $9^a$ and $9^b$ are adapted to coöperate with the vibrating contacts 7 and 8 respectively, and are provided with screws or binding posts 13ª and 13ᵇ to facilitate making circuit connections. In this modification the binding post 15 is dispensed with. The rectifying circuit through this modification is as follows:—Binding post 13ª and contact 9ª, contact 7, armature 2, armature 3, contact 8, and contact 9ᵇ to binding post 13ᵇ. In this modification each time the circuit is broken there are at least two breaks in series. The drop in potential across each of the breaks is thus decreased, and the apparatus is adapted to be used on relatively high voltage circuits without injurious sparking.

In the modification of my improved rectifier illustrated in Figs. 5 and 6, magnets 30 and 31 are provided, which are preferably permanent magnets of the same form as the magnet shown in Figs. 1 and 2. In the gap of the magnet 30 armatures 32, 33 and 34 are located, and in the gap of the magnet 31 armatures 35, 36 and 37 are located. The magnet 30 is mounted upon a frame or base 38 of conductive material, and the magnet 31 is mounted upon a frame or base 39 of conductive material. The armatures 32, 33 and 34 are mounted so as to be capable of vibration in the gap of the magnet 30, and preferably independently of each other, as for example, by mounting the same upon a pivot 40 of conductive material supported in the frame 38, and the armatures 35, 36 and 37 are mounted so as to be capable of vibration in the gap of the magnet 31, and preferably independently of each other, as for example, by mounting the same upon the pivot 41 of conductive material supported in the frame 39. The armatures 32, 33 and 34 are provided with contacts 42, 43 and 44 respectively, and the armatures 35, 36 and 37 are provided with contacts 45, 46 and 47 respectively. The contacts 42, 43, 44, 45, 46 and 47 have relatively large contact surfaces and are preferably of carbon and are mounted on their respective armatures in any suitable manner. The contacts 42, 43 and 44 are adapted to coöperate with the stationary contact 65, preferably adjustably mounted upon one pole of the magnet 30, and the contacts 45, 46 and 47 are adapted to coöperate with the stationary contact 66, preferably adjustably mounted upon one pole of the magnet 31. The contacts 65 and 66 have relatively large conducting surfaces and are preferably made of conducting metal such as brass or copper, but may be made of carbon. The contacts 65 and 66 are provided with screws or binding posts 48 and 49 respectively to facilitate making circuit connections. An adjustable back stop 50 is provided for the armatures 32, 33 and 34, and an adjustable back stop 51 is provided for the armatures 45, 46 and 47. An actuating coil 52 surrounds all of the armatures and may be supported by the frames or bases 38 and 39. The frames 38 and 39 are mounted upon an insulating support 53. The armatures 32, 33 and 34 are in electrical connection with the frame 38 through the pivot 40, and in order to secure good electrical connection, wires 54, 55 and 56 connecting the armatures 32, 33 and 34 respectively to the frame 38 are provided. The armatures 35, 36 and 37 are in electrical connection with the frame 39 through the pivot 41, and wires 57, 58 and 59 are provided connecting the armatures 35, 36 and 37 respectively with the frame 39 in order to insure good electrical connection between the armatures and the frame. The wires 54, 55, 56, 57, 58 and 59 are secured to the armatures near their pivotal axes so as to interfere as little as possible with their freedom of vibration. The frame 38 is connected to the contact 66 by the conductor 60. The frame 39 is provided with a binding post 61. In connecting up the modification shown in Figs. 4 and 5, the coil 52 is connected either directly across the alternating current mains, or preferably in series with an adjustable condenser and across the mains. The contact 65 is connected to one side of the alternating current circuit by means of the screw or binding post 48, and the binding post 61 is connected to the direct translating device to which uni-directional current is to be supplied. The other side of the direct current translating device is connected to the other side of the alternating current circuit, preferably through an adjustable rheostat. The circuit through the rectifying device when the contacts are closed is as follows:—To contact 65, then dividing into three paths, the first through the contact 42 and the armature 32 to the frame 38; the second, through the contact 43, and the armature 33, to the frame 38; and the third, through the contact 44 and the armature 34 to the frame 38; then from the frame 38 through conductor 60 to the contact 66; at the contact 66, the circuit again divides into three branches: the first, through the contact 45 and the armature 35 to the frame 39; the second, through the contact 46 and the armature 36 to the frame 39; the third, through the contact 47 and armature 37 to the frame 39; then from the frame 39 through the binding post 61 to the direct current translating device. This condition of affairs continues during one half wave of the alternating current, and during the succeeding half wave the circuit is broken. In this manner uni-directional current is supplied to the direct current translating device.

The rectifier shown in Figs. 5 and 6 may also be modified by dispensing with the binding post 61 and the connection 60, and by electrically connecting together the frames 38 and 39. When thus modified the device is connected in the rectifying circuit by means of the screws or binding posts 48 and 49. This arrangement gives also a series-parallel connection.

In the modification of my improved rectifier in which the series-parallel connection is employed, the advantages of both the series and the parallel connections hereinbefore set forth are secured.

In the structure illustrated in Figs. 5 and 6, a simple series connection may be obtained by replacing the armatures, 32, 33 and 34 by a single armature and the armatures 35, 36 and 37 by a single armature.

The kind of carbon I prefer to use for the contacts is graphitic in character, and wherever I employ the word "carbon" in the appended claims, I mean to include graphite.

Having now described my invention, what I claim and desire to protect by Letters Patent is as follows:—

1. In an alternating current rectifier, means for producing magnetic flux, a plurality of armatures adapted to vibrate in the field of said flux and provided with contacts for opening and closing a circuit, the said contacts being connected in series when in circuit-closing position, and an actuating coil surrounding said armatures, substantially as described.

2. In an alternating current rectifier, a plurality of armatures provided with contacts for opening and closing a circuit, the said contacts being connected in series-parallel when in circuit closing position, and an actuating coil for the armatures, substantially as described.

3. In an alternating current rectifier, a plurality of armatures capable of independent vibration and provided with contacts for opening and closing a circuit, the said contacts being connected in series-parallel when in circuit closing position, and an actuating coil for the armatures, substantially as described.

4. In an alternating current rectifier, a plurality of armatures provided with contacts for opening and closing a circuit, the said contacts being connected in series-parallel when in circuit closing position, and an actuating coil surrounding the armatures, substantially as described.

5. In an alternating current rectifier, a plurality of armatures capable of independent movement and provided with contacts for opening and closing a circuit, the said contacts being connected in series-parallel when in circuit closing position, and an actuating coil surrounding the armatures, substantially as described.

This specification signed and witnessed this 12th day of December, 1911.

THOS. A. EDISON.

Witnesses:
HENRY LANAHAN,
ANNA R. KLEHM.

---

It is hereby certified that in Letters Patent No. 1,221,981, granted April 10, 1917, upon the application of Thomas A. Edison, of Llewellyn Park, West Orange, New Jersey, for an improvement in "Alternating-Current Rectifiers," an error appears in the printed specification requiring correction as follows: Page 3, line 97, after the word "direct" insert the word *current;* and that the said Letters Patent should be read with this correction therein that the same may conform to the record of the case in the Patent Office.

Signed and sealed this 20th day of November, A. D., 1917.

[SEAL.]

R. F. WHITEHEAD,

*Acting Commissioner of Patents.*

Cl. 175—365.